United States Patent
Yoon

[11] Patent Number: 5,819,784
[45] Date of Patent: Oct. 13, 1998

[54] WATER PURIFIER HAVING A WATER DISCHARGE VALVE FOR DRAINING WATER STORAGE TANKS

[75] Inventor: Deok-Joong Yoon, Suwon, Rep. of Korea

[73] Assignee: Samsung Electronics Co., Ltd., Suwon, Rep. of Korea

[21] Appl. No.: 777,390

[22] Filed: Dec. 27, 1996

[30] Foreign Application Priority Data

Dec. 30, 1995 [KR] Rep. of Korea ............... 1995-69114

[51] Int. Cl.⁶ ............................................. F16K 11/065
[52] U.S. Cl. .................. 137/312; 137/334; 137/599.1; 137/625.4; 222/108; 222/146.1
[58] Field of Search .................... 137/312, 334, 137/599, 599.1, 625.4; 222/108, 129, 146.1

[56] References Cited

U.S. PATENT DOCUMENTS

| | | | |
|---|---|---|---|
| 3,223,122 | 12/1965 | Banker | 137/625.4 |
| 3,366,328 | 1/1968 | Feinberg | 137/625.4 X |
| 4,792,059 | 12/1988 | Kerner et al. | 222/146.1 X |
| 5,307,958 | 5/1994 | Burrows | 222/146.1 |
| 5,476,118 | 12/1995 | Yokoyama | 137/599 |

*Primary Examiner*—Stephen M. Hepperle
*Attorney, Agent, or Firm*—Burns, Doane, Swecker & Mathis, L.L.P.

[57] ABSTRACT

A water purifier includes a housing containing hot and cold water storage tanks. Hot and cold water spigots are connected to the hot and cold water tanks, respectively, for dispensing hot and cold water. A water retainer tray is disposed beneath the spigots to collect water dripped during dispensing. A residual water discharge pipe discharges the water from the retainer tray. A stored water discharge pipe is connected to the water tanks to enable all water therein to be purged when it is time to clean the tanks. A valve mechanism joins the residual water discharge pipe and the stored water discharge pipe to a common discharge pipe. The valve mechanism is operable such that when the stored water discharge pipe is open to the common discharge pipe, the residual water discharge pipe is closed, to prevent water from backing up to the retainer while the hot and cold water tanks are being drained.

10 Claims, 7 Drawing Sheets

WATER PURIFIER HAVING A WATER DISCHARGE VALVE FOR DRAINING WATER STORAGE TANKS

BACKGROUND OF THE INVENTION

1. Field of the Invention

The present invention relates to a water purifier having hot and cold water storage tanks, and a valve mechanism controlling the draining of those tanks.

2. Description of the Prior Art

Generally, a hot and cold water purifier serves to pass fresh water supplied from a faucet through separate filtering means, to remove foreign objects contained therein and to perform the water purification.

The hot and cold water purifier thus described, as illustrated in FIGS. 1, 2 and 3, has a body 10 thereof intercoupled by a front panel 11, a rear panel 12, two lateral panels 13, an upper panel 14 and a bottom panel 15.

The front panel 11 is provided at a predetermined external position thereof with a water retainer 16 for collecting residual water dropping from a discharge valve (described later) and behind the water retainer 16, there is connected a residual water discharge tube 17 for discharging the residual water collected therein to waste.

Furthermore, the body 10 is crosswise disposed at a predetermined height with a first partition member 20 and a second partition member respectively in order to form vertically adjacent voids E and F.

A third partition member 22 is vertically disposed between the two partition members 20 and 21 to thereby form a void G of a predetermined area.

Between the first partition member 20 and the second partition member 21, there is crosswise disposed a fourth partition member 23 mounted on the third partition member 22 in order to form voids H and I, each having a predetermined area.

The void E is provided with a tank 30 for storing the purified water of a predetermined quantity.

The front panel 11 is provided with a control box 40 for inputting instructions for the operation of the product (water purifier).

The void F is provided with a compressor 50 for compressing refrigerant to a high pressure and a high temperature, a condenser 60 for condensing the refrigerant, and cooling means 70 disposed therebetween for cooling the compressor 50 and the condenser 60.

The void G is provided with a plurality of filtering means 90 replaceably supported by first and second filter fixing brackets 80 and 81. The second partition member 21 is provided at an upper side thereof with a pressurizing pump 100.

In other words, the plurality of filtering means includes, as illustrated in FIG. 4, a sediment filter 91 mounted by a first filter fixing bracket 80 so as to remove floating substances such as rusty sediment and the like when the fresh water supplied from a faucet (not shown) passes therethrough, a pre-processing filter 92 mounted by a first filter fixing bracket 80 so as to eliminate foreign objects such as chlorine substances and the like contained in the fresh water when the fresh water supplied from the sediment filter 91 passes therethrough, first and second membrane filters 93 and 94 mounted by a first filter fixing bracket 80 so as to get rid of various heavy metals and carcinogens contained in the fresh water when the fresh water supplied from the pre-processing filter 82 and pressurized by the pressurizing pump 100 passes therethrough, a post-processing filter 95 mounted by a first filter fixing bracket 80 so as to remove odor and harmful gaseous substances contained in fresh water supplied from the first and the second membrane filters 93 and 94, and a sterilizing filter 96 mounted by a second filter fixing bracket 81 so as to sterilize bacteria included in the fresh water when the fresh water supplied from the post-processing filter 95 passes therethrough.

The sediment filter 91, the pre-processing filter 92, the first and the second membrane filters 93 and 94, the post-processing 95, the sterilizing filter 96 and the pressurizing pump 100 are inter-connected by connecting hoses 97 for guiding the flow of the fresh water.

Furthermore, the first and the second membrane filters 93 and 94 are connected with a concentrated water pipe 98 for discharging concentrated (waste) water generated in the course of a filtering operation.

Meanwhile, the void H is provided with a hot water tank 110 and a cold water tank 120 so as to be supplied with the purified water stored in the purified water storage tank 30 through a first and a second purified water pipe 31 and 31 at predetermined quantity respectively.

The hot water tank 110 is inherently provided with a heater member 111 for heating the purified water stored therein by being supplied with an electric power to thereby generate heat.

A cooling coil 21 is spirally wound around an external side of the tank 120 for receiving liquid refrigerant to cool the purified water in the cold water tank 120.

The hot water tank 110 and the cold water tank 120 are connected to water dispensing pipes 112 and 122 mounted thereon which are in turn connected to hot water and cold water dispensing spigots or valves 130 and 131 externally protruding through the front panel 11.

The hot water tank 110 and the cold water tank 120 are respectively connected to hot water discharge pipe 113 and cold water discharge pipe 123 (as illustrated in FIG. 5) for discharging all of the water from the tanks 110, 120 (to enable the tanks to be cleaned). The pipes 113, 123 are mounted to solenoid valves 150 and 151 so that the water discharged from one of the tanks 110, 120 will not enter the other tank.

Lower ends of the hot water discharge pipe 113 and the cold water discharge pipe 123 are connected to a first elbow pipe 160, one side of which is connected to a first connecting water discharge pipe 170 so that the stored water discharged simultaneously from the hot water discharge pipe 113 and the cold water discharge pipe 123 can join to thereby be discharged through one discharge pipeline.

A tip end of the first connecting water discharge pipe 170 and the residual water discharge tube of the water retainer 16 are joined together by a second elbow pipe 161.

The second elbow pipe 161 is connected at one side thereof to a second connecting water discharge pipe 171 so that the stored water discharged through the first connecting water discharge pipe 160 and the residual water freely discharged through the residual water discharge tube 17 from the water retainer 16 can join to thereafter be discharged through one discharging pipeline.

Meanwhile, the void I is provided with a main printed circuit board PCB 140 to control operation of the product (water purifier).

In a water purifier thus constructed, when function and selection buttons (no reference numerals designated) provided at a control box disposed at an upper front side of the body 10 are manipulated to thereby activate the pressurizing pump 100, the fresh water supplied by water pressure from a faucet (not shown) flows through the plurality of filtering means 90 according to the pressure generated by the activation of the pressurizing pump 100.

In other words, the fresh water supplied from the faucet (not shown) has floating substances such as rusty sediments and the like removed when it passes through the sediment filter 91, and foreign objects such as chlorine substances and the like contained in the fresh water are eliminated when it passes through the pre-processing filter 92 from the sediment filter 91.

Various heavy metals and carcinogens contained in the fresh water are removed when the fresh water passes through the first and the second membrane filters 93 and 94 from the pre-processing filter 92.

Furthermore, odor and obnoxious gaseous substances included in the fresh water are eliminated when it passes through the first and the second membrane filters from the post-processing filter 95. The harmful bacteria contained in the fresh water is removed when it passes through the sterilizing filter 96 from the post-processing filter 95. The purified water is thereafter supplied into the purified water storage tank 30.

Successively, the purified water stored in the purified water storage 30 is supplied through the first and the second purified water pipes 31 and 32 to the hot water tank 110 and cold water tank 120 respectively.

In other words, the purified water flowing along the first purified water pipe 31 is continuously supplied to a lower side of the hot water tank 110 until it reaches a full water level, and the purified water flowing along the second purified water pipe 32 is continuously supplied to an upper side of the cold water tank 120 until it reaches a full water level.

It is not until the hot water tank 110 and the cold water tank 120 are supplied with the purified water that the supply of the purified water is stopped. The pressurizing pump 100 is then stopped when the purified water is stored at a predetermined quantity according to a detected signal from a water level sensor (not shown) mounted at one side of the purified water storage tank 30.

Meanwhile, when the heater member 111 provided in the hot water tank 110 is activated it heats the water to an established temperature.

Successively, when the compressor 50 is activated to supply the cold water, the gaseous refrigerant of high temperature and high pressure is supplied to the condenser 60 by the compressor 50, and the refringent flowing in the condenser 60 is condensed by blown wind according the operation of cooling means 70.

The gaseous refrigerant condensed in the course of passing through the condenser 60 is changed to liquid refrigerant of high pressure and high temperature, the temperature being a bit higher than room temperature which is an ambient temperature of the water purifier, and passes through a capillary tube to thereafter be reduced in pressure.

The liquid refrigerant reduced in pressure is infused into the cooling coil 121 wound around a periphery of the cold water tank 120 and is expanded to thereby be vaporized at low temperature and low pressure. At the same time, the refrigerant serves to cool the purified water stored in the cold water tank 120.

Meanwhile, when a user wants to dispense the purified hot and cold water stored in the hot water and cold water tank 110 and 120 into a vessel such as cup (not shown), first, the vessel is closely pressed against a water disposal lever 136 of either the hot water or cold water valves. Then the water discharge valves 130 and 131 are opened so that hot or cold water is dispensed into the cup.

However, there is a problem in a water discharge apparatus of a water purifier according to the prior art thus constructed, in that, water may back up through the residual water discharge pipe 17 and overflow at the water retainer 16 due to a difference of water head raised by internal pressure when the stored water in the hot water and the cold water tanks 110 and 120 are being discharged in order to periodically perform a tank cleaning procedure.

SUMMARY OF THE INVENTION

Accordingly, the present invention is provided to solve the afore-mentioned problem and it is an object of the present invention to provide a selective water discharge valve apparatus of a water purifier for selectively opening a stored water discharge pipeline and a residual water discharge pipeline, so that the phenomenon of the stored water backflowing along a residual water discharge line to a water retainer due to a difference of water head raised by an internal pressure when the stored water in hot water and cold water tanks is discharged outside in order to clean the tanks, the apparatus comprising:

a valve at a location where a stored water discharge passage and a residual water discharge pipeline join so that the stored water being discharged can be prevented from backflowing along the residual water discharge pipeline.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF A PREFERRED EMBODIMENT OF THE INVENTION

Figure 1:
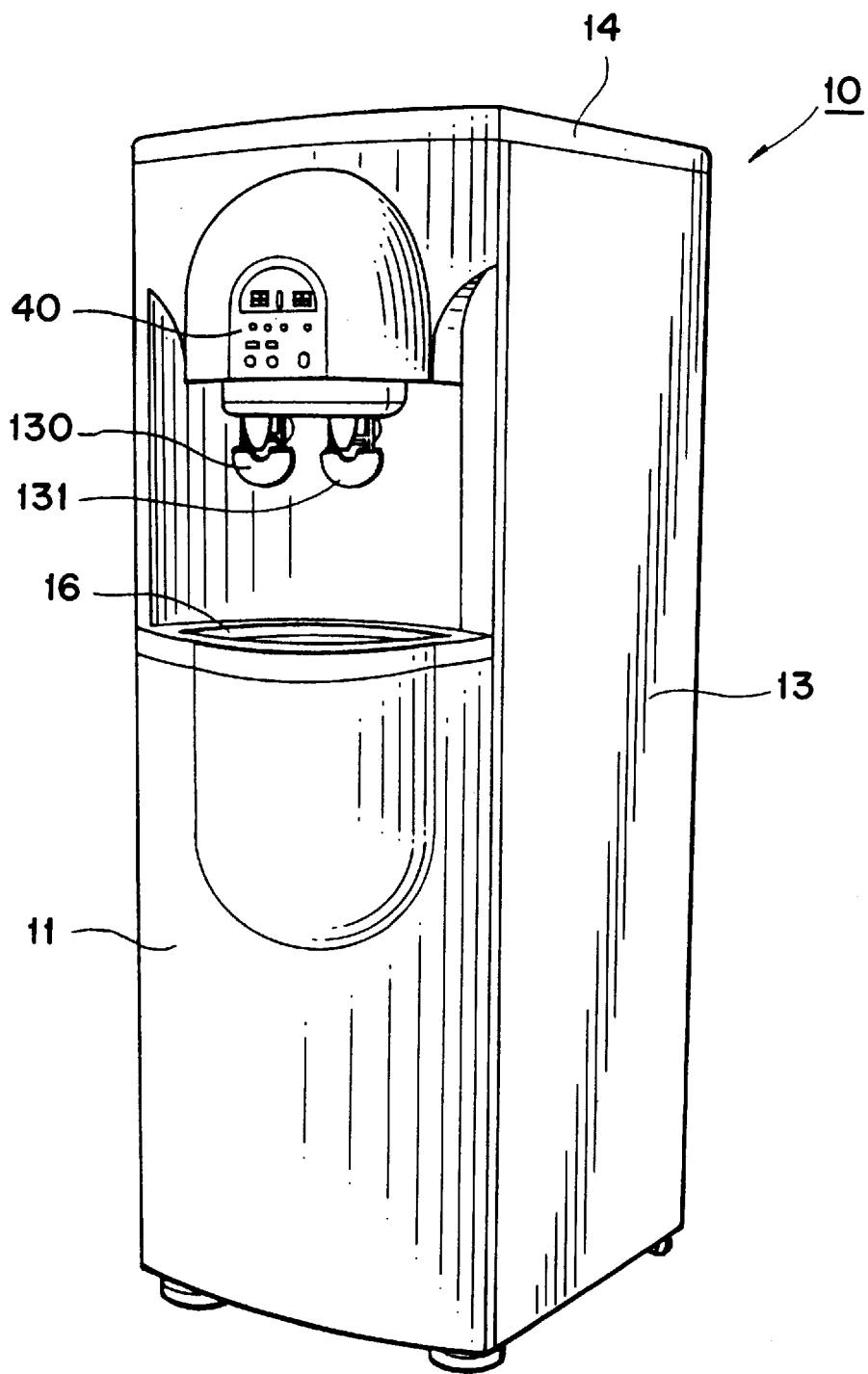
FIG. 1 is a perspective view for illustrating a cold and hot water purifier according to the prior art.
Figure 2:
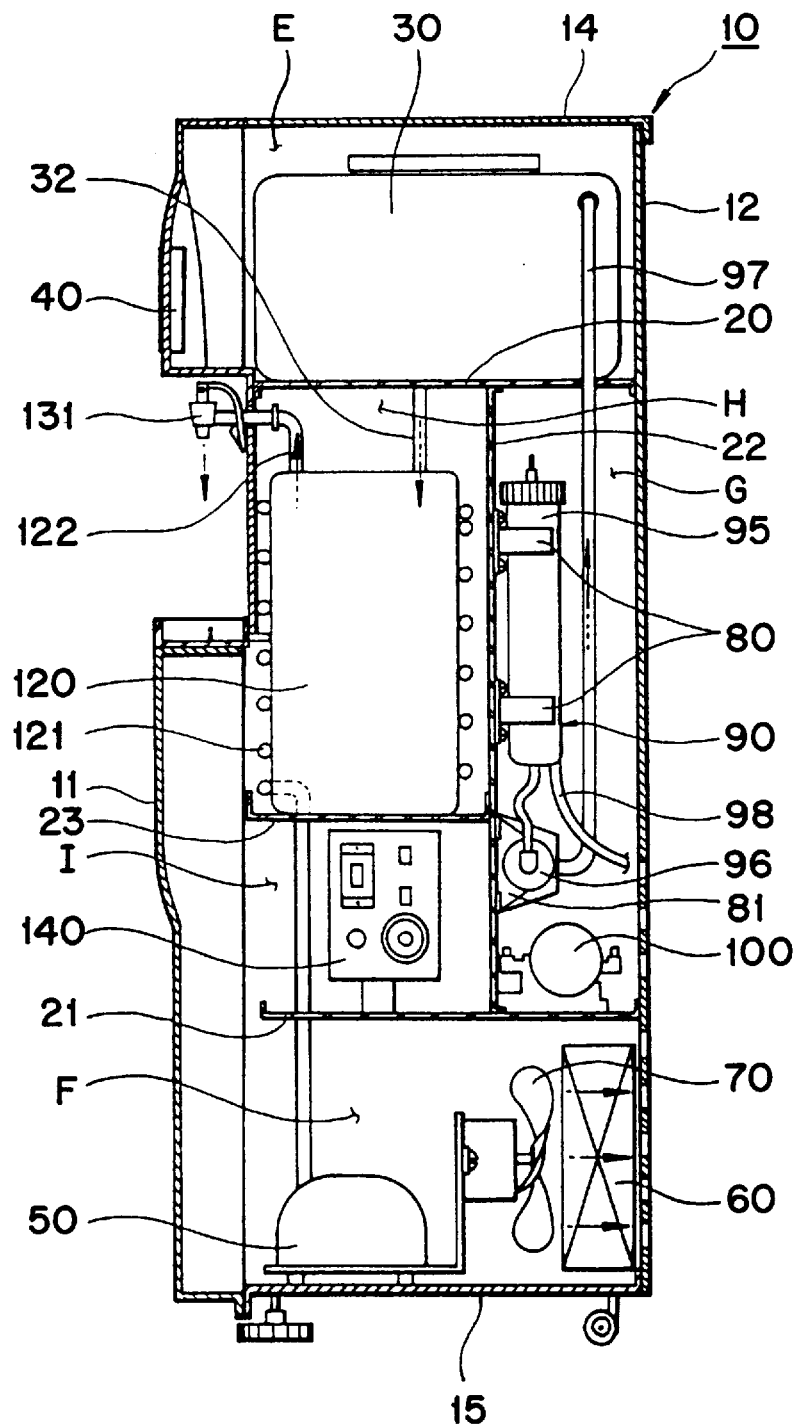
FIG. 2 is a sectional view of a cold and hot water purifier according to the prior art.
Figure 3:
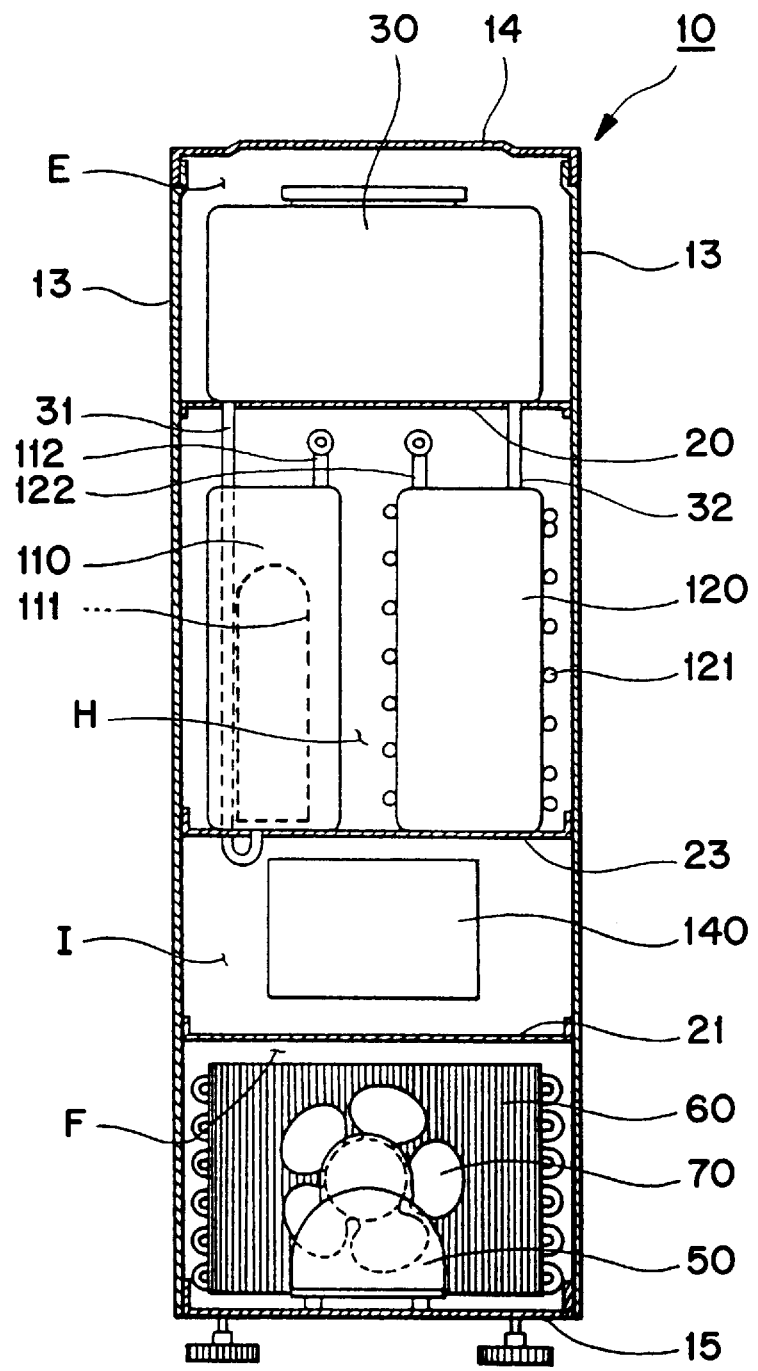
FIG. 3 is another sectional view for illustrating the cold and hot water purifier according to the prior art.
Figure 4:
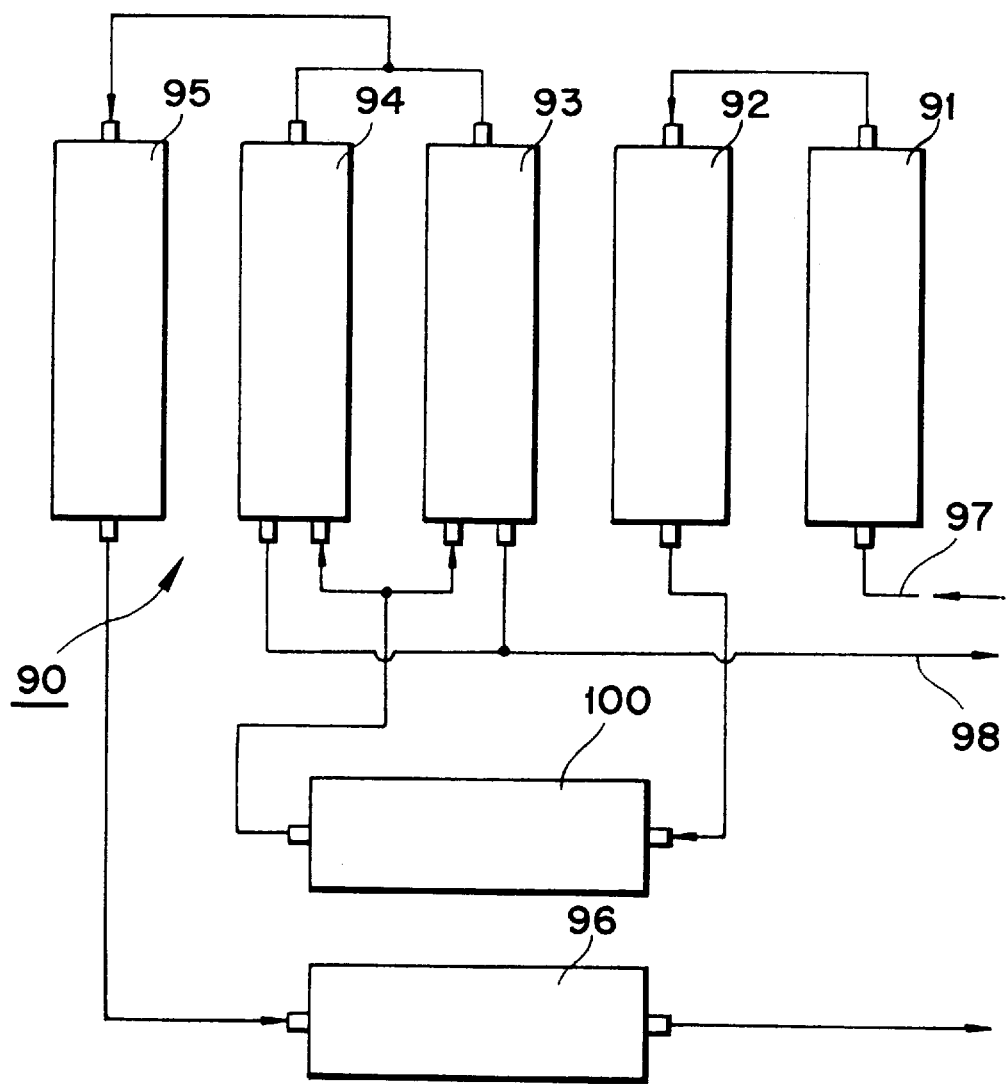
FIG. 4 is a flow chart for illustrating filters according to the prior art.
Figure 5:
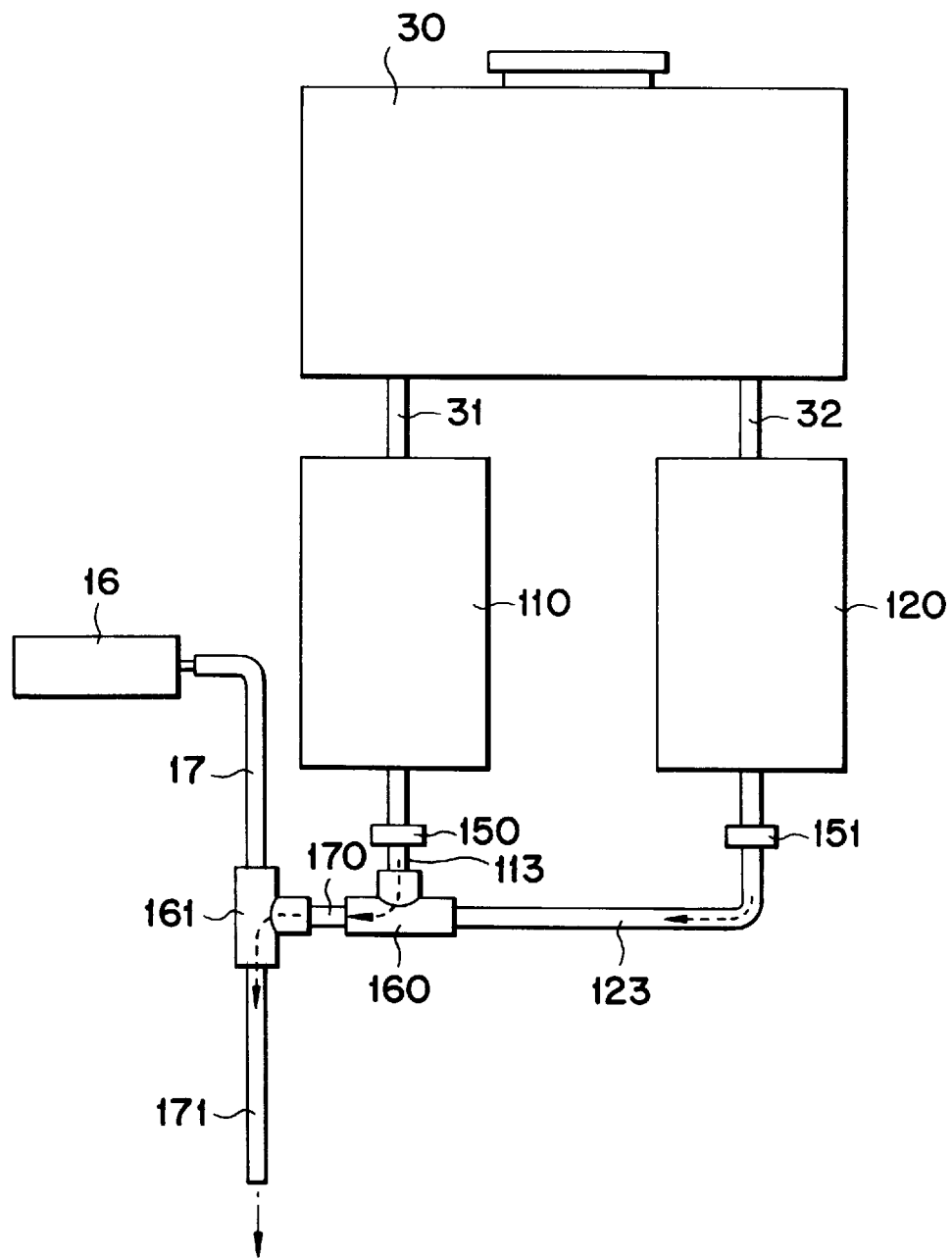
FIG. 5 is a schematic diagram for illustrating a water discharge system according to the prior art.

The preferred embodiment of the present invention will now be described in detail with reference to the accompanying drawings.

Throughout the drawings, like reference numerals and nomenclature are used for designation of like or equivalent parts or portions for simplicity of illustration and explanation.

Figure 6:
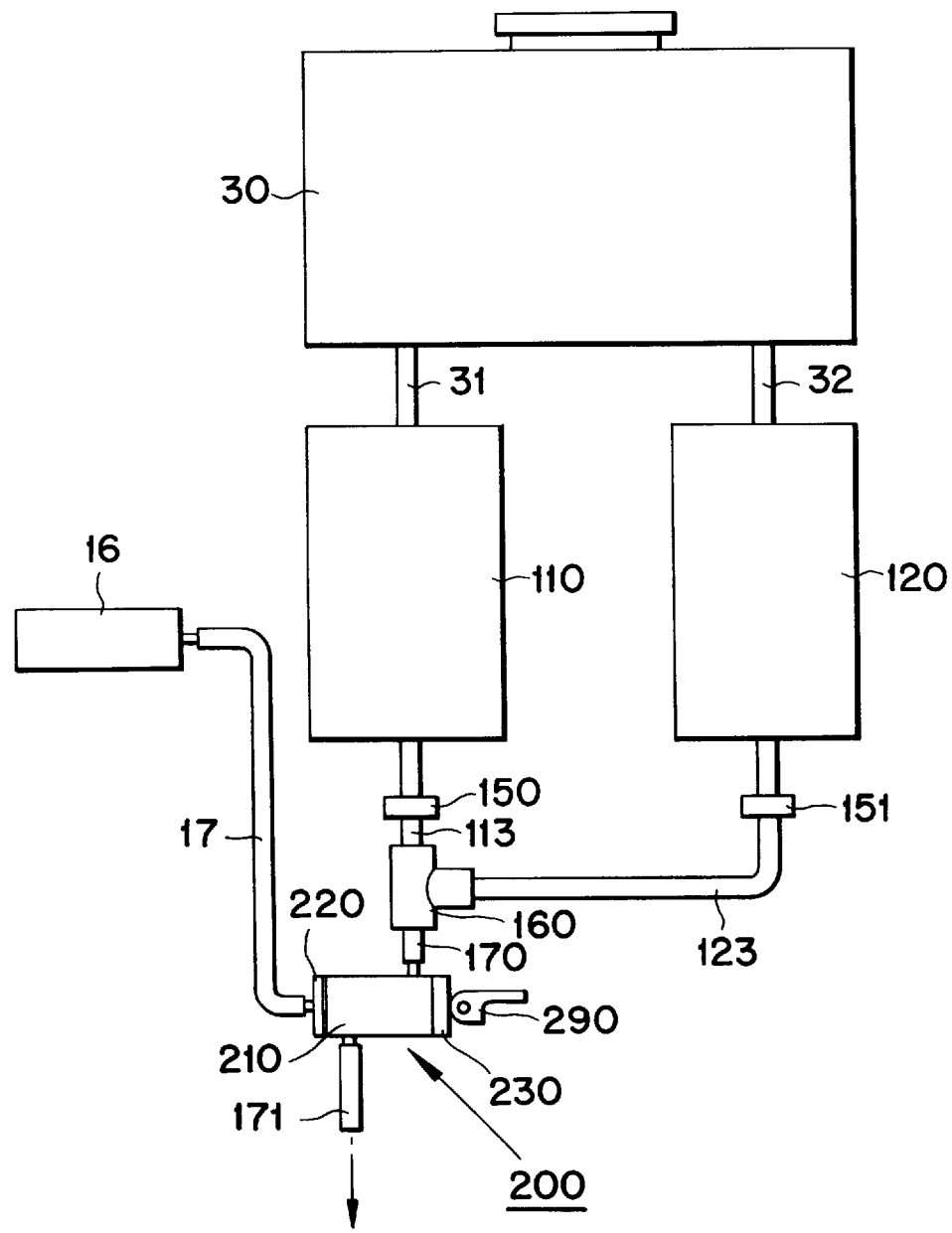
FIG. 6 is a schematic diagram for illustrating a water discharge system according to the present invention.

Reference numeral 200 is FIG. 6 is a water discharge valve means for selectively opening and closing a water discharge passage at an area where a stored water discharge pipeline and a residual water discharge pipeline join, to thereby prevent the stored water discharged from the hot water and cold water tanks 110 and 120 from overflowing through the water retainer 16.

Figure 7:
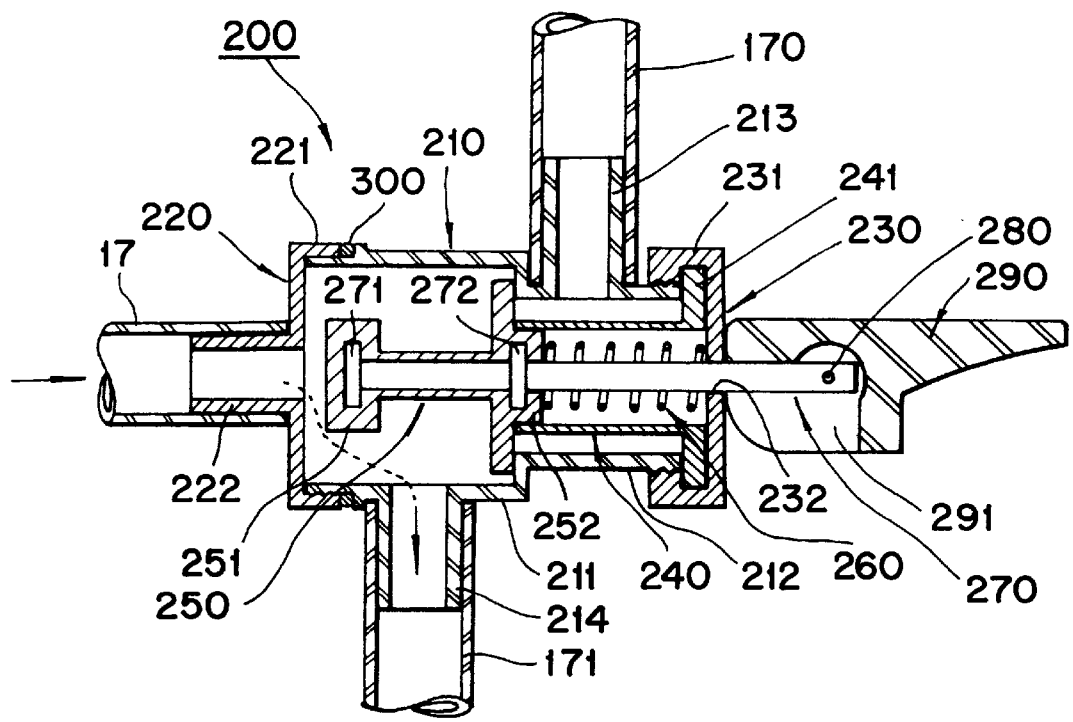
FIG. 7 is a sectional view for illustrating one state of a valve mechanism according to the present invention.
Figure 8:
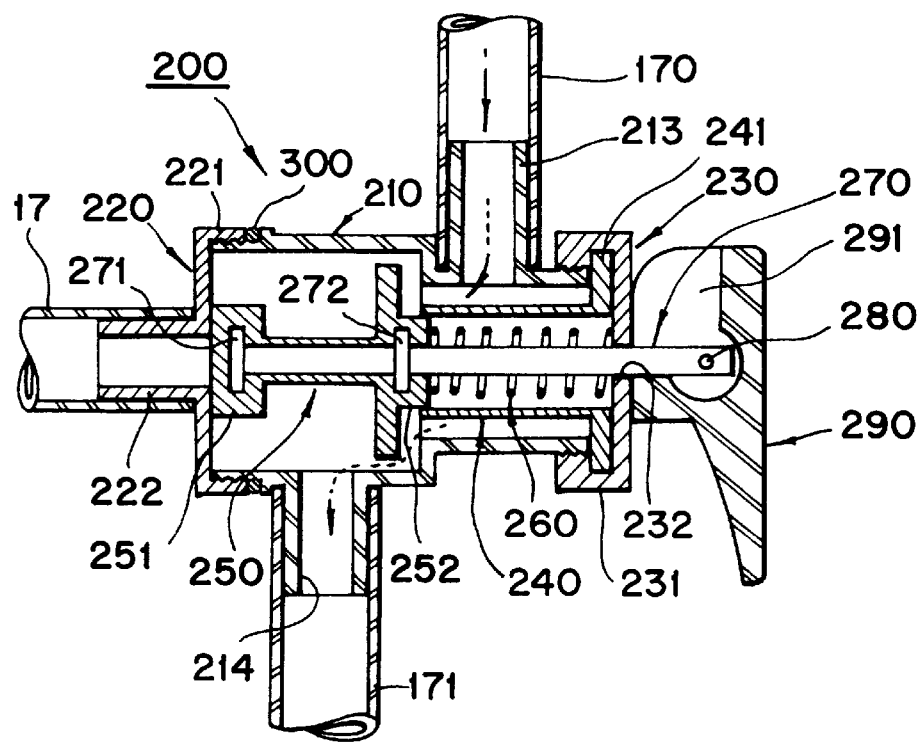
FIG. 8 is a sectional view for illustrating another state of the valve mechanism according to the present invention.

In other words, the discharge water switching means 200 includes, as illustrated in FIG. 6,7 and 8 a cylindrical body 210 formed in such way that the first and the second water discharge pipes 170 and 171 can be connected to an upper side and at a bottom side thereof respectively, at horizontally spaced locations to thereby form together a mutual water discharge passage. A first connecting cap 220 is screwed to a front side of the body 210 to allow the residual water discharge pipe 17 to be connected to the body 210 and simultaneously to be connected to the bottom water discharge passage 171 of the body 210. A second connecting cap 230 is screwed to a rear side of the body 210. A hollow sealing body 240 is fixed at one side thereof to the second connecting cap 230, and the other side thereof is spaced from an inner surface of the body 210 by a predetermined spacing. A valve body 250 has one end thereof inserted into the sealing body 240 and is movable forwardly (to the left in FIG. 7) to open water discharge passage 17*a*, and at the same time, to close the water discharge passage 17. The valve body 250 can close the water discharge passage 170 and at the same time open the water discharge passage 17 when moved rearwardly (see FIG. 8). A resilient body 260 is inserted into an inner surface of the sealing body 240 so as to bias the valve body 250 resiliently forward. An operational 270 axle has one side thereof coupled to the valve body 250 and the other side thereof projects through the second connecting cap 230. An operational lever 290 is hinged to a tip end of the outwardly protruded axle by a hinge pin 280 and abuts an external surface of the second connecting cap so as to pull the valve body 250 backward when rotated.

At this time, the body 210 is formed by a first or front cylindrical unit 211 and a second or rear cylindrical unit 212 having a smaller diameter than the first cylindrical unit 211.

Furthermore, the second cylindrical unit 212 is formed at an upper external periphery thereof with an inlet 213 connected to the first connecting water discharge pipe 170.

The first cylindrical unit 211 is formed at a bottom periphery thereof with an outlet 214 connected to the second connecting water discharge pipe 171 which is common to the pipes 17 and 170.

At front and rear sides of the first and the second cylindrical units 211 and 212, respectively, there are formed male screw threads meshed with the first and the second connecting caps 220 and 230.

The first connecting cap 220 is integrally formed at a fear side thereof with a flange unit 221 having female screw threads meshed with a front side of the body 210 and is formed with an infuse inlet 222 connected to the residual water discharge pipe 17.

The second connecting cap 230 is integrally formed at a front side thereof with a flange unit 231 having female screw threads meshed to a rear side of the body 210, and is formed with a through hole 232 so as to allow the operational axle 270 to penetrate therethrough.

The hollow sealing body 240 is integrally formed at a rear side thereof with a flange 241 fixed between the body 210 and the second connecting cap 230.

The valve body 250 is integrally formed at a front side thereof with a first adhesion unit 251 so as to open and close the infuse inlet 222 and is integrally formed at a rear side thereof with a second adhesion unit 252. A radially inner portion of the unit 252 is inserted into the sealing body 240 to be horizontally slidable therein. A radially outer portion of the unit 252 is engageable with a front side of the second cylindrical unit 212 to thereby open and close the inlet 213.

The resilient body 260 comprises a coil compression spring.

The operational axle 270 is a ring-shaped rod formed with first and second protrusions 271 and 272 mounted in the valve body 250 to thereby be coupled to the first adhesion unit 251 and the second adhesion unit 252 and a hinge hole receiving a hinge in 280.

The operational lever 290 is formed at a central front side thereof with an operational groove 291 of a predetermined depth so that the operational axle 270 can be inserted therein, and is formed with a hinge hole receiving the hinge pi 280.

Numeral 300 in the drawing is a packing member.

Next, the operational effect of the present invention thus constructed will be described.

As illustrated in FIGS. 6 and 7, when the operational lever 290 of the water discharge valve means 200 is lifted in order to discharge residual water collected in the water retainer 16, the operational lever 290 is rotated upward at a predetermined angle around the hinge pin 280 and is stopped at a predetermined position.

The lever 290 thereby pulls the operational axle 270 backward to open the infuse inlet 222.

The second adhesion unit 252 of the rear side of the valve body 250 also engages the second cylindrical unit 212 to thereby close the stored water discharge pipeline 170.

At this time, the residual water collected at the retainer 16 flows along the residual water discharge pipe 17 and passes through the residual water discharge pipeline as indicated by a dotted arrow in FIG. 7 and at the same time, is discharged through the second connecting water discharge pipe 171.

Meanwhile, in order to periodically clean the purified water storage tank 30, and the hot water and cold water tank 110 and 120 the water therein is discharged by opening the solenoids 150 and 151 to thereby open the hot water and cold water discharge pipes 113 and 123.

Then, the operational lever 290 is pushed as illustrated in FIG. 8, whereby the lever 290 is rotated downward around the hinge pin 280 and at the same time, is stopped at a predetermined position.

Successively, the valve body 250 coupled to the operational axle 270 is moved forward by the resilient force of the resilient body 260 to thereby cause the first adhesion unit 251 to close the infuse inlet 222.

The second adhesion unit 252 simultaneously opens the stored water discharge pipeline 170.

In this case, the stored water in the hot and the cold water tanks 110 and 120 flows along the hot water discharge pipe 113 and the cold water discharge pipe 123 respectively and join together at the first elbow pipe 160.

The stored water then flows through the first connecting discharge pipe 170 and flows through the stored water discharge pipeline as indicated by a dotted arrow in FIG. 8 and at the same time, is discharged along the second connecting water discharge pipe 171.

At this, time, because the stored water passing through the stored water discharge pipeline of the discharge water valve means 200 cannot flow back along the residual water discharge line 17, the stored water is prevented from backflowing into the water retainer 16 due to a difference in water head raised by internal pressure generated by the stored water in the hot water and cold water tanks 110 and 120 when drained.

What is claimed is:

1. A water purifier comprising:

a housing containing a hot water tank for storing hot purified water, and a cold water tank for storing cold purified water;

hot and cold water spigots connected to the hot and cold water tanks, respectively, for dispensing hot or cold water;

a water retainer disposed beneath the hot and cold water spigots for collecting dripped water;

a residual water discharge pipe connected to the water retainer for discharging water from the water retainer;

a stored water discharge pipe connected to the hot water tank and the cold water tank for discharging all water therefrom; and a valve mechanism selectively connecting the residual water discharge pipe and the stored water discharge pipe to a common water discharge pipe, the valve mechanism being operable to connect the stored water discharge pipe to the common water discharge water pipe while closing communication between the stored water discharge pipe and the residual water discharge pipe.

2. The water purifier according to claim 1 wherein the valve mechanism is operable to connect the residual water discharge pipe to the common water discharge pipe while closing communication between the stored water discharge pipe and the common water discharge pipe.

3. The water purifier according to claim 2 wherein the valve mechanism comprises a valve body forming an internal space; the residual water discharge pipe, the stored water discharge pipe, and the common water discharge pipe being coupled to the body; the common water discharge pipe being in continuous communication with the space; the valve mechanism further comprising a valve element movable between a first position closing communication between the residual water discharge pipe and the space while opening communication between the stored water discharge pipe and the space, and a second position closing communication between the stored water discharge pipe and the space while opening communication between the residual water discharge pipe and the space.

4. The water purifier according to claim 3 wherein the valve mechanism further comprises a manually actuable lever operably connected to the valve element for controlling the movement of the valve element between its first and second positions.

5. The water purifier according to claim 3 wherein the valve mechanism further comprises front and rear caps coupled to front and rear sides respectively, of the valve body; a hollow sealing body disposed in the space and engaging the rear cap; a rear end of the valve element including a radially inner portion slidable within the sealing body; a spring arranged in the sealing body for biasing the valve element forwardly toward the front cap; an axle extending through the sealing body and having a front end connected to the valve element, and a rear end projecting through the rear cap; a manual lever pivotably connected to the rear end of the axle and engageable with a rear surface of the rear cap so that rotation of the lever in one direction causes the axle to pull the valve element rearwardly, whereby a radially outer portion of the rear end of the valve element closes the stored water discharge pipe, and a front end of the valve element opens the residual water discharge pipe, and rotation of the lever in another direction causes the spring to displace the valve element forwardly whereby the front end of the valve element closes the residual water discharge pipe, and the radially outer portion of the rear end of the valve element opens the stored water discharge pipe.

6. The water purifier according to claim 5 wherein the valve body comprises integral front and rear cylindrical portions, the rear portion being of smaller diameter than the front portion to form a step therewith, the radially outer portion of the rear end of the valve element engaging the step and a front end of the sealing body for closing the stored water discharge pipe.

7. The water purifier according to claim 5, wherein the front and rear caps are screwed to the valve body.

8. The water purifier according to claim 5 wherein the residual water discharge pipe is coupled to the front cap.

9. The water purifier according to claim 5 wherein a rear end of the sealing body includes a radially outwardly projecting flange clamped between the valve body and the rear cap.

10. The water purifier according to claim 5 wherein the spring comprises a coil compression spring extending around the axle and bearing against the rear cap and the radially inner portion of the rear end of the valve element.

* * * * *